United States Patent
Xu et al.

(10) Patent No.: US 9,821,845 B2
(45) Date of Patent: Nov. 21, 2017

(54) TRAILER LENGTH ESTIMATION METHOD USING TRAILER YAW RATE SIGNAL

(71) Applicant: Ford Global Technologies, LLC, Dearborn, MI (US)

(72) Inventors: Li Xu, Northville, MI (US); Hongtei Eric Tseng, Canton, MI (US); Thomas Edward Pilutti, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/736,391

(22) Filed: Jun. 11, 2015

(65) Prior Publication Data

US 2016/0362135 A1    Dec. 15, 2016

(51) Int. Cl.
*B62D 13/06* (2006.01)
*B62D 15/02* (2006.01)

(52) U.S. Cl.
CPC ........... *B62D 13/06* (2013.01); *B62D 15/021* (2013.01)

(58) Field of Classification Search
CPC ........... G01S 13/00; G01S 13/08; B60Q 1/00; G08G 1/16; B62D 13/06; B62D 15/021
See application file for complete search history.

(56) References Cited

U.S. PATENT DOCUMENTS

| | | | |
|---|---|---|---|
| 4,727,419 A | 2/1988 | Yamada et al. | |
| 4,778,060 A | 10/1988 | Wessner, Jr. | |
| 5,132,851 A | 7/1992 | Bomar et al. | |
| 5,455,557 A | 10/1995 | Noll et al. | |
| 5,523,947 A | 6/1996 | Breen | |
| 5,541,778 A | 7/1996 | DeFlorio | |
| 6,292,094 B1 | 9/2001 | Deng et al. | |
| 6,301,548 B1 | 10/2001 | Gerum | |
| 6,806,809 B2 | 10/2004 | Lee et al. | |
| 6,820,888 B1 | 11/2004 | Griffin | |
| 6,959,970 B2 | 11/2005 | Tseng | |
| 6,999,856 B2 | 2/2006 | Lee et al. | |
| 7,447,585 B2 | 11/2008 | Tandy, Jr. et al. | |
| 7,715,953 B2 | 5/2010 | Shepard | |

(Continued)

FOREIGN PATENT DOCUMENTS

| | | |
|---|---|---|
| DE | 3931518 A1 | 4/1991 |
| DE | 9208595 U1 | 8/1992 |

(Continued)

OTHER PUBLICATIONS

Tofel, Kevin C., "How to measure anything with a camera and software", Feb. 6, 2007, 6 pgs. ≠Retrieved from http://giaom.com/2007/06/how_to_measure/ on Sep. 4, 2014.

(Continued)

*Primary Examiner* — Basil T Jos
(74) *Attorney, Agent, or Firm* — Raymond Coppiellie; Price Heneveld LLP

(57) ABSTRACT

A backup assist system for a vehicle reversing a trailer includes a trailer sensor module generating a trailer yaw rate and a vehicle sensor system generating a vehicle yaw rate and a vehicle speed. The system further includes a controller determining an estimated length of the trailer based on an estimated hitch angle, the vehicle yaw rate, the vehicle speed, and the trailer yaw rate in view of a kinematic relationship.

20 Claims, 9 Drawing Sheets

(56) References Cited

U.S. PATENT DOCUMENTS

| | | |
|---|---|---|
| 7,731,302 B2 | 6/2010 | Tandy, Jr. et al. |
| 7,798,263 B2 | 9/2010 | Tandy, Jr. et al. |
| 7,904,222 B2 | 3/2011 | Lee et al. |
| 7,974,444 B2 | 7/2011 | Hongo |
| 8,010,252 B2 | 8/2011 | Getman et al. |
| 8,073,594 B2 | 12/2011 | Lee et al. |
| 8,190,364 B2 | 5/2012 | Rekow |
| 8,498,757 B2 | 7/2013 | Bowden et al. |
| 8,547,401 B2 | 10/2013 | Mallinson et al. |
| 8,571,777 B2 | 10/2013 | Greene |
| 8,576,115 B2 | 11/2013 | Basten |
| 8,675,953 B1 | 3/2014 | Elwell et al. |
| 8,755,984 B2 | 6/2014 | Rupp et al. |
| 8,811,698 B2 | 8/2014 | Kono et al. |
| 8,886,400 B2 | 11/2014 | Kossira et al. |
| 8,909,426 B2 | 12/2014 | Rhode et al. |
| 8,930,140 B2 | 1/2015 | Trombley et al. |
| 9,042,603 B2 | 5/2015 | Elwart et al. |
| 9,102,271 B2 | 8/2015 | Trombley et al. |
| 9,132,856 B2 | 9/2015 | Shepard |
| 9,164,955 B2 | 10/2015 | Lavoie et al. |
| 9,248,858 B2 | 2/2016 | Lavoie et al. |
| 9,315,212 B1 | 4/2016 | Kyrtsos et al. |
| 9,335,162 B2 | 5/2016 | Kyrtsos et al. |
| 9,340,228 B2 | 5/2016 | Xu et al. |
| 9,352,777 B2 | 5/2016 | Lavoie et al. |
| 2002/0128764 A1 | 9/2002 | Hecker et al. |
| 2004/0222881 A1 | 11/2004 | Deng et al. |
| 2005/0055138 A1* | 3/2005 | Lee .................. G05D 1/0891 701/1 |
| 2005/0074143 A1 | 4/2005 | Kawai |
| 2006/0244579 A1 | 11/2006 | Raab |
| 2008/0231701 A1 | 9/2008 | Greenwood et al. |
| 2009/0005932 A1 | 1/2009 | Lee et al. |
| 2009/0085775 A1 | 4/2009 | Otsuka et al. |
| 2009/0248346 A1 | 10/2009 | Fennel et al. |
| 2009/0280859 A1 | 11/2009 | Bergh |
| 2010/0272370 A1 | 10/2010 | Schilling et al. |
| 2011/0125457 A1 | 5/2011 | Lee et al. |
| 2011/0160956 A1 | 6/2011 | Chung et al. |
| 2011/0181457 A1 | 7/2011 | Basten |
| 2012/0200706 A1 | 8/2012 | Greenwood et al. |
| 2012/0221168 A1* | 8/2012 | Zeng .................. G08G 1/09626 701/1 |
| 2012/0271522 A1 | 10/2012 | Rupp et al. |
| 2013/0158863 A1 | 6/2013 | Skvarce et al. |
| 2013/0268160 A1 | 10/2013 | Trombley et al. |
| 2013/0321347 A1 | 12/2013 | Kim |
| 2014/0005918 A1 | 1/2014 | Qiang |
| 2014/0012465 A1 | 1/2014 | Shank et al. |
| 2014/0052337 A1 | 2/2014 | Lavoie et al. |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0085472 A1 | 3/2014 | Lu et al. |
| 2014/0160276 A1 | 6/2014 | Pliefke et al. |
| 2014/0172232 A1 | 6/2014 | Rupp et al. |
| 2014/0188344 A1 | 7/2014 | Lavoie |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277942 A1 | 9/2014 | Kyrtsos et al. |
| 2014/0297128 A1 | 10/2014 | Lavoie et al. |
| 2014/0297129 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0379217 A1 | 12/2014 | Rupp et al. |
| 2015/0057903 A1 | 2/2015 | Rhode et al. |
| 2015/0066296 A1 | 3/2015 | Trombley et al. |
| 2015/0120141 A1 | 4/2015 | Lavoie et al. |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0269444 A1 | 9/2015 | Lameyre et al. |
| 2016/0039456 A1 | 2/2016 | Lavoie et al. |
| 2016/0059888 A1 | 3/2016 | Bradley et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0280267 A1 | 9/2016 | Lavoie et al. |

FOREIGN PATENT DOCUMENTS

| | | |
|---|---|---|
| DE | 10154612 A1 | 5/2003 |
| DE | 102004050149 A1 | 4/2006 |
| DE | 102005042957 A1 | 3/2007 |
| DE | 102006002294 A1 | 7/2007 |
| DE | 102006035021 | 4/2010 |
| DE | 102008043675 A1 | 5/2010 |
| DE | 102009007990 A1 | 8/2010 |
| DE | 102011108440 A1 | 1/2013 |
| DE | 102012006206 A1 | 10/2013 |
| EP | 0418653 A1 | 3/1991 |
| EP | 1593552 B2 | 3/2007 |
| EP | 1810913 A1 | 7/2007 |
| EP | 2487454 A2 | 8/2012 |
| EP | 2551132 A1 | 1/2013 |
| WO | 2012059207 A1 | 5/2012 |
| WO | 2014019730 A1 | 2/2014 |
| WO | 2014070047 A1 | 5/2014 |
| WO | 2015187467 A1 | 12/2015 |

OTHER PUBLICATIONS

Novak, Domen; Dovzan, Dejan; Grebensek, Rok; Oblak, Simon, "Automated Parking System for a Truck and Trailer", International Conference on Advances in the Internet, Processing, Systems and Interdisciplinary Research, Florence, 2007, WorldCat.org, 13 pgs.

Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.

Ratajczak, Robert; Grajek, Tomasz; Wegner, Krzysztof; Klimaszewski, Krzusztof; Kurc, Maciej; Domanski, Marek, "Vehicle Dimensions Estimation Scheme Using AAM on Stereoscopic Video", date unknown, pp. 4321-4325.

"Measure and Calculate Distance", Help Forum, Google Maps, 1 pg. [Retrieved from https://support.google.com/maps/answer/1628031?hl=en on Sep. 4, 2014].

De Brito, Jr., Jailson A.; De Campos, Luis Edmundo Prado; "Automatic Vehicle Classification Using Learning-based Computer Vision and Fuzzy Logic", Departmento de Ciencia da Computacao, Instituto de Matematics, Universidade Federal da Bahia, date unknown, 4 pgs.

Dlagnekov, Louka; Belongie, Serge, "Recognizing Cars", Department of Computer Science and Engineering, University of California, San Diego, CA, date unknown, pp. 1-8.

Olof Enqvist, "AFS-Assisted Trailer Reversing," Institutionen för systemteknik Deartment of Electrical Engineering, Jan. 27, 2006, pp. 1-57.

\* cited by examiner

TRAILER LENGTH ESTIMATION METHOD USING TRAILER YAW RATE SIGNAL

FIELD OF THE INVENTION

The disclosure made herein relates generally to trailer motion and parameter estimation, and more particularly to a length estimation for a trailer using yaw signals in a system to assist with vehicle guidance of the trailer, such as a trailer backup assist system.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer frequently estimate the position of the trailer relative to the vehicle with a sensor that determines a steering input for the vehicle based on an input trailer curvature path and determined a hitch angle. Both the hitch angle determination and the steering input determination require use of a kinematic model of the combined trailer and vehicle that includes the length of the trailer, more particularly, from the point of attachment with the vehicle to the front axle thereof. While some systems have relied on user input for the trailer length, doing so may place an undesired burden on the user and may introduce inaccuracies that some such systems are unequipped to handle. The accuracy and reliability of the calculations involving trailer length can be critical to the operation of the backup assist system. Accordingly, improvements related to automated system estimation of trailer length in an accurate manner may be desired.

SUMMARY OF THE INVENTION

According to one aspect of the present invention, a backup assist system for a vehicle reversing a trailer includes a trailer sensor module generating a trailer yaw rate and a vehicle sensor system generating a vehicle yaw rate and a vehicle speed. The system further includes a controller determining an estimated length of the trailer based on an estimated hitch angle, the vehicle yaw rate, the vehicle speed, and the trailer yaw rate in view of a kinematic relationship.

According to another aspect of the present invention, a system for estimating the length of a trailer towed by a vehicle includes a first sensor coupled with the trailer for determining a trailer yaw rate and a second sensor coupled with the vehicle for determining a vehicle yaw rate. The system further includes a controller determining an estimated length of the trailer based on an estimated hitch angle, the vehicle yaw rate, the vehicle speed, and the trailer yaw rate in view of a kinematic relationship between the trailer and the vehicle.

According to another aspect of the present invention, a method for estimating the length of a trailer towed by a vehicle includes receiving a trailer yaw rate signal, receiving a vehicle yaw rate signal, and receiving a vehicle speed signal. The method further includes determining an estimated length of the trailer based on an estimated hitch angle, the vehicle yaw rate signal, the vehicle speed signal, and the trailer yaw rate signal in view of a kinematic relationship between the trailer and the vehicle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
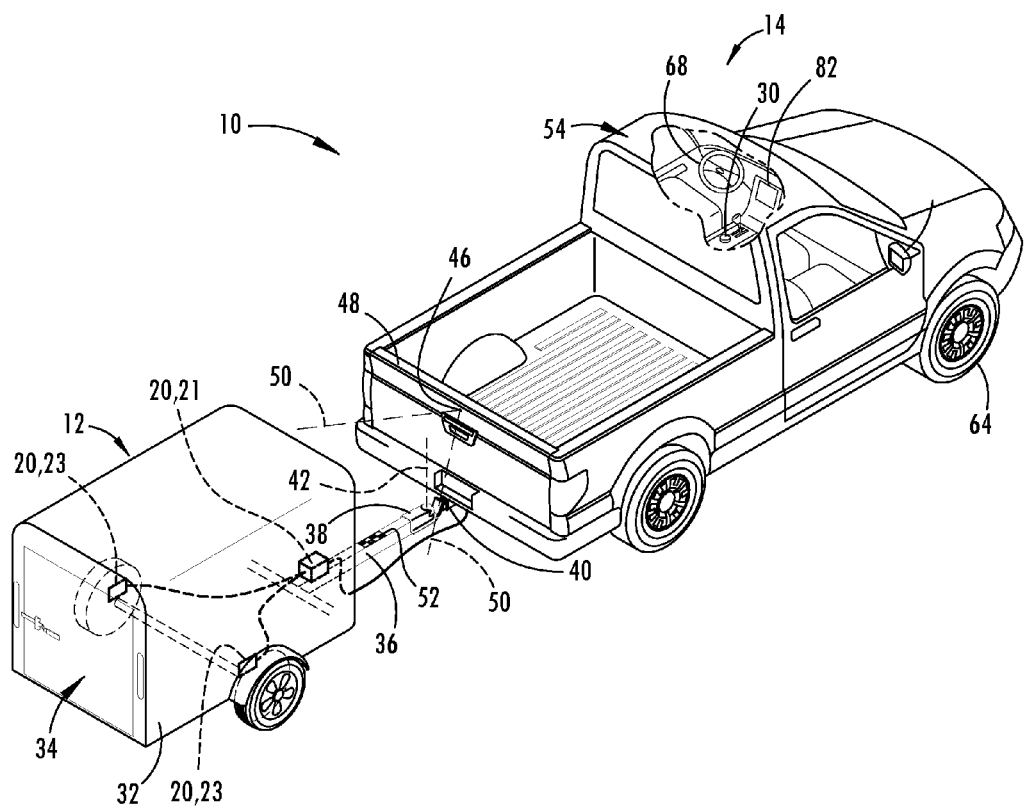
FIG. 1 is a top perspective view of a vehicle attached to a trailer with one embodiment of a hitch angle sensor for operating a trailer backup assist system.

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

Referring to FIGS. 1-12, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. To monitor the position of the trailer 12 relative to the vehicle 14, the trailer backup assist system 10 may include a sensor system 16 that senses or otherwise determines a hitch angle γ between the trailer 12 and the vehicle 14. In one embodiment, the sensor system 16 may include a sensor module 20 attached to the trailer 12 that monitors the dynamics of the trailer 12, such as yaw rate, and communicates with a controller 28 of the trailer backup assist system 10 to determine the instantaneous hitch angle γ. Accordingly, one embodiment of a sensor module 20 is adapted to attach to the trailer 12 and generate a trailer yaw rate $\omega_2$. The trailer backup assist system 10 according to such an embodiment may also include a vehicle sensor system 17 that generates a vehicle yaw rate $\omega_1$ and a vehicle speed $v_1$. The controller 28 of the trailer backup assist system 10 may thereby estimate a hitch angle γ based on the trailer yaw rate $\omega_2$, the vehicle yaw rate $\omega_1$ and the vehicle speed $v_1$ in view of a kinematic relationship between the trailer 12 and the vehicle 14 that may be dependent on include a value for the length D of the trailer 12. In such an embodiment, under predetermined conditions, a reference hitch angle $\gamma_{ref}$ may be determined independent of the trailer length D. The reference hitch angle may then be used to derive a trailer length estimate D using the kinematic model. Once a reliable trailer length estimate D has been derived, the hitch angle γ may be estimated in conditions where such an estimate is dependent on the trailer length D on an ongoing basis.

With respect to the general operation of the trailer backup assist system 10, a steering input device 18 may be provided, such as a rotatable knob 30, for a driver to provide the desired curvature 26 of the trailer 12. As such, the steering input device 18 may be operable between a plurality of selections, such as successive rotated positions of a knob 30, that each provide an incremental change to the desired curvature 26 of the trailer 12. Upon inputting the desired curvature 26, the controller may generate a steering command for the vehicle 14 to guide the trailer 12 on the desired curvature 26 based on the estimated hitch angle γ and a kinematic relationship between the trailer 12 and the vehicle 14. Therefore, the accuracy of the hitch angle estimation, and accordingly, the trailer length estimation is critical to operating the trailer backup assist system 10.

With reference to the embodiment shown in FIG. 1, the vehicle 14 is a pickup truck embodiment that is equipped with one embodiment of the trailer backup assist system 10 for controlling the backing path of the trailer 12 that is attached to the vehicle 14. Specifically, the vehicle 14 is pivotally attached to one embodiment of the trailer 12 that has a box frame 32 with an enclosed cargo area 34, a single axle having a right wheel assembly and a left wheel assembly, and a tongue 36 longitudinally extending forward from the enclosed cargo area 34. The illustrated trailer 12 also has a trailer hitch connector in the form of a coupler assembly 38 that is connected to a vehicle hitch connector in the form of a hitch ball 40. The coupler assembly 38 latches onto the hitch ball 40 to provide a pivoting ball joint connection 42 that allows for articulation of the hitch angle γ. It should be appreciated that additional embodiments of the trailer 12 may alternatively couple with the vehicle 14 to provide a pivoting connection, such as by connecting with a fifth wheel connector. It is also contemplated that additional embodiments of the trailer may include more than one axle and may have various shapes and sizes configured for different loads and items, such as a boat trailer or a flatbed trailer.

Still referring to FIG. 1, the sensor system 16 in the illustrated embodiment includes a sensor module 20 that may include a housed sensor cluster 21 mounted on the tongue 36 of the trailer 12 proximate the enclosed cargo area 34 and includes left and right wheel speed sensors 23 on laterally opposing wheels of the trailer 12. It is conceivable that the wheel speed sensors 23 may be bi-directional wheel speed sensors for monitoring both forward and reverse speeds. Also, it is contemplated that the sensor cluster 21 in additional embodiments may be mounted on alternative portions of the trailer 12. The sensor module 20 generates a plurality of signals indicative of various dynamics of the trailer 12. The signals may include a yaw rate signal, a lateral acceleration signal, and wheel speed signals generated respectively by a yaw rate sensor 25, an accelerometer 27, and the wheel speed sensors 23.

In the illustrated embodiment, the yaw rate sensor 25 and the accelerometer 27 are contained within the housed sensor cluster 21, although other configurations are conceivable. It is conceivable that the accelerometer 27, in some embodiments, may be two or more separate sensors and may be arranged at an offset angle, such as two sensors arranged at plus and minus forty-five degrees from the longitudinal direction of the trailer or arranged parallel with the longitudinal and lateral directions of the trailer, to generate a more robust acceleration signal. It is also contemplated that these sensor signals could be compensated and filtered to remove offsets or drifts, and smooth out noise. Further, the controller 28 may utilizes processed signals received outside of the sensor system 16, including standard signals from the brake control system 72 and the power assist steering system 62, such as vehicle yaw rate $\omega_1$, vehicle speed $v_1$, and steering angle δ, to estimate the trailer hitch angle γ, trailer speed, and related trailer parameters. As described in more detail below, the controller 28 may estimate the hitch angle γ based on the trailer yaw rate $\omega_2$, the vehicle yaw rate $\omega_1$, and the vehicle speed $v_1$ in view of a kinematic relationship between the trailer 12 and the vehicle 14. The controller 28 of the trailer backup assist system 10 may also utilize the estimated trailer variables and trailer parameters to control the steering system 62, brake control system 72, and the powertrain control system 74, such as to assist backing the vehicle-trailer combination or to mitigate a trailer sway condition.

The sensor system 16 may also include a vision-based hitch angle sensor 44 for estimating the hitch angle γ between the vehicle 14 and the trailer 12. In an embodiment wherein the hitch angle γ is estimated using the trailer yaw rate $\omega_2$, the vehicle yaw rate $\omega_1$, and the vehicle speed $v_1$ in view of the kinematic relationship between the trailer 12 and the vehicle 14, the vision-based hitch angle sensor 44 may be used as a backup system or as an additional check on the value obtained using the kinematic relationship. In another embodiment, the vision-based hitch angle sensor 44 may be omitted entirely. When present, the illustrated hitch angle sensor 44 employs a camera 46 (e.g. video imaging camera) that may be located proximate an upper region of the vehicle tailgate 48 at the rear of the vehicle 14, as shown, such that the camera 46 may be elevated relative to the tongue 36 of the trailer 12. The illustrated camera 46 has an imaging field of view 50 located and oriented to capture one or more images of the trailer 12, including a region containing one or more desired target placement zones for at least one target 52 to be secured. Although it is contemplated that the camera 46 may capture images of the trailer 12 without a target 52 to determine the hitch angle γ, in the illustrated embodiment, the trailer backup assist system 10 includes a target 52 placed on the trailer 12 to allow the trailer backup assist system 10 to utilize information acquired via image acquisition and processing of the target 52. For instance, the illustrated camera 46 may include a video imaging camera that repeatedly captures successive images of the trailer 12 that may be processed to identify the target 52 and its location on the trailer 12 for determining movement of the target 52 and the trailer 12 relative to the vehicle 14 and the corresponding hitch angle γ. It should also be appreciated that the camera 46 may include one or more video imaging cameras and may be located at other locations on the vehicle 14 to acquire images of the trailer 12 and the desired target placement zone, such as on a passenger cab 54 of the vehicle 14 to capture images of a gooseneck trailer. Furthermore, it is contemplated that additional embodiments of the hitch angle sensor 44 and the sensor system 16 for providing the hitch angle γ may include one or a combination of a potentiometer, a magnetic-based sensor, an optical sensor, a proximity sensor, a rotational sensor, a capacitive sensor, an inductive sensor, or a mechanical based sensor, such as a mechanical sensor assembly mounted to the pivoting ball joint connection 42, energy transducers of a reverse aid system, a blind spot system, and/or a cross traffic alert system, and other conceivable sensors or indicators of the hitch angle γ to supplement or be used in place of the vision-based hitch angle sensor 44.

Figure 2:
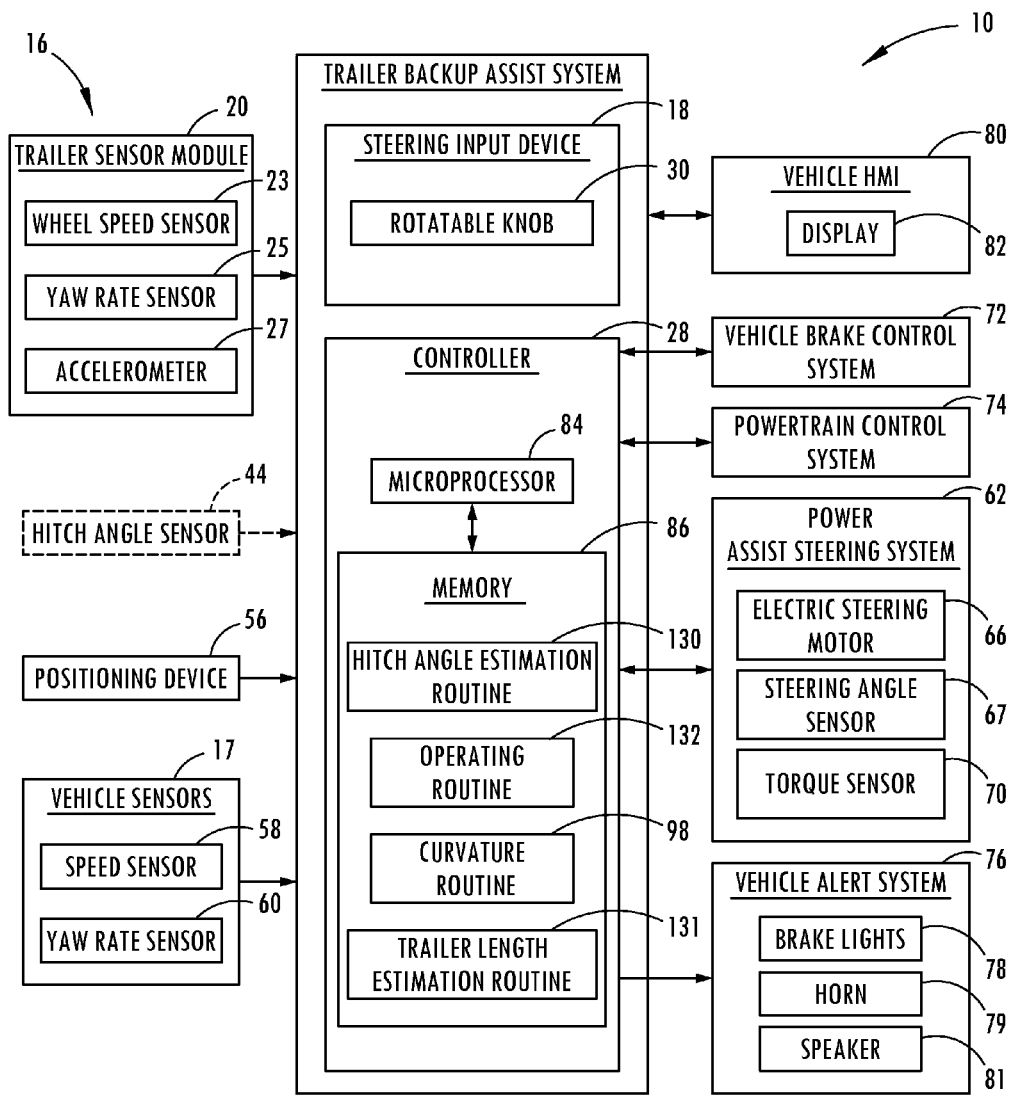
FIG. 2 is a block diagram illustrating one embodiment of the trailer backup assist system having a steering input device, a curvature controller, and a trailer braking system.

With reference to the embodiment of the trailer backup assist system 10 shown in FIG. 2, the hitch angle sensor 44 is provided in dashed lines to illustrate that in some embodiments it may be omitted, such as when the trailer sensor module 20 is provided and used to estimate hitch angle γ. The illustrated embodiment of the trailer backup assist system 10 receives vehicle and trailer status-related information from additional sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14 and based on the estimated hitch angle γ. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, the hitch angle sensor 44 and other vehicle sensors and devices may provide sensor signals or other information, such as proximity sensor signals or successive images of the trailer 12, that the controller of the trailer backup assist system 10 may process with various routines to determine an indicator of the hitch angle γ, such as a range of hitch angles.

As further shown in FIG. 2, one embodiment of the trailer backup assist system 10 is in communication with a power assist steering system 62 of the vehicle 14 to operate the steered wheels 64 (FIG. 1) of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering (EPAS) system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel 68 (FIG. 1). However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

Referring again to the embodiment illustrated in FIG. 2, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 2, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. In certain embodiments, the trailer backup assist system 10 can provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions. Examples of unacceptable trailer backup conditions include, but are not limited to, a vehicle 14 over speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 2, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 2, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 2, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

Figure 3:
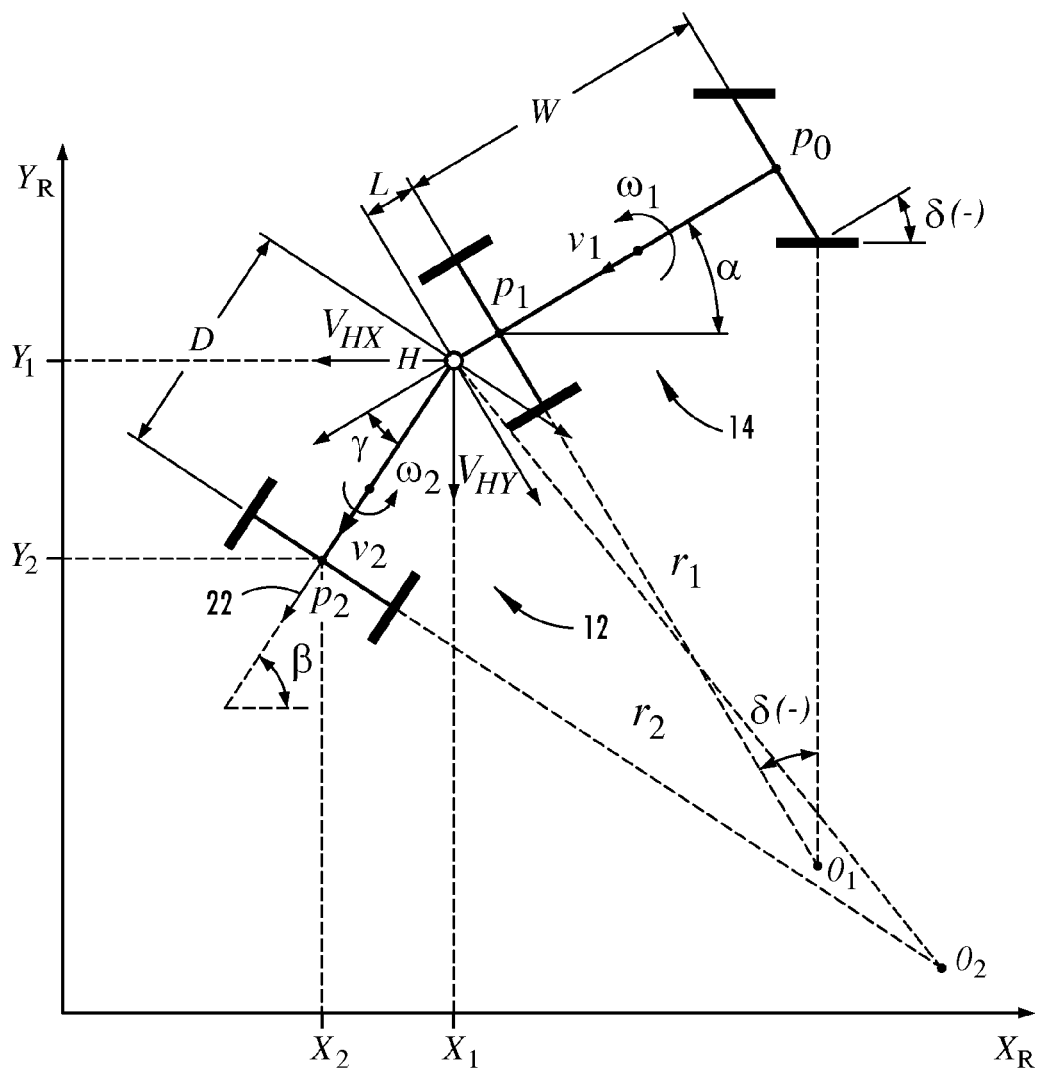
FIG. 3 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

With reference to FIG. 3, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 3, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle ($\gamma = \beta - \alpha$);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

One embodiment of a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot{\beta}$ is trailer yaw rate and $\dot{\eta}$ is trailer velocity).

$$\kappa_2 = \frac{1}{r_2} = \frac{\dot{\beta}}{\dot{\eta}} = \frac{\left(W + \frac{KV^2}{g}\right)\sin\gamma + L\cos\gamma\tan\delta}{D\left(\left(W + \frac{KV^2}{g}\right)\cos\gamma + L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{D\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

In an additional embodiment, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

As can be appreciated based on the foregoing, there are various ones of the kinematic parameters in the curvature $\kappa_2$ and steering input δ equations that are generally fixed and correspond to the dimensions of the vehicle 14 and trailer 12 combination. Specifically, the length D of the trailer 12, the wheel base W of the vehicle 14, and the distance L from the hitch connection H to the rear axle of the vehicle 14 are generally fixed and may be stored in the memory 86 of system 10 (FIG. 2), whereas other kinematic parameters may be dynamic and obtained from trailer sensor module 20 and vehicle sensors 17 on an ongoing basis. It is noted that the wheel base of the vehicle 14 and the distance from the hitch connection to the rear axle of the vehicle 14 relate only to vehicle 12 itself, within which the controller 28 and, accordingly, memory 86 are installed. It follows, then, these parameters may be stored in memory 86 during manufacture of vehicle 14, or during installation of the relevant portions of system 10 therein, as they are known in relation to the specific make and model of the particular vehicle 14. On the other hand, the length of the trailer 12, while fixed with respect to a particular initiated operating routine 132, may vary as different trailers 12 are hitched to vehicle 14 for towing thereby. Further, the particular trailer 12 with which a given vehicle 14 will be used may not be known during manufacture of vehicle 14 or installation of system 10, and a user of such a vehicle 14 may wish to use vehicle 14 in various operating routines 132 with various trailers 12 of different sizes and configurations. Accordingly, a routine for system 10 obtaining the particular trailer length D of a trailer hitched with vehicle 14 may be needed and may be required prior to system 10 implementing operating routine 132.

In one aspect, vehicle 12 may include various features to facilitate the accurate measuring of the trailer length D by a user. In particular, such features may provide a mechanism to allow flexibility for the user in measuring the trailer length D with a reduced risk of error and a streamlined process for inputting the measured value for the trailer length D without manual numeric input using HMI 80 or the like. In a particular aspect, an encoder similar to an electronic tape measure device may be mounted on the rear of vehicle 14. The encoder may include a string, wire, tape, or similar structure that can be extended outwardly from vehicle 14 by a user until it extends to the first axle of the trailer 12 installed with vehicle 14. The module, would automatically read the distance by which the measuring structure is extended from the module, either by reading a series of visible, physical, or magnetic markings along the measuring structure, or using a potentiometer operably coupled with a reel on which the measuring structure is stored. The module can be electrically coupled with controller 28 or the like such that controller 28 can store the measured trailer length D in memory (which, in an example, can correspond to a maximum length of withdrawn measuring structure prior to release by the user and withdrawing thereof by the module). In one example, controller 28 can be restricted in storing such a measurement to when a "calibration mode" has been entered, such as by a user, when a new trailer 12 has been installed with the vehicle 14.

In another aspect, a short-range radar module may be incorporated into vehicle 14. Such short-range radar (which may already be present in vehicle 14 for use by a backup warning system, an active cruise control system, or the like) may be electrically coupled with and used by controller 28 to locate one or more "corner cubes" that can be strategically placed on trailer 12 in relation to (e.g. directly above) the front axle thereof. Corner cubes are generally known and are accepted as reliable reflectors of radar and can be used reliably for distance measurements. In an example, corner cubes with magnetic bases can be provided with vehicle 14 for mounting on the particular trailer 12 installed with vehicle 14 at a given time. Further, by using a triangulation method, two corner cubes placed on opposite sides of trailer 12 can also be used to determine the hitch angle $\gamma$.

Figure 4:
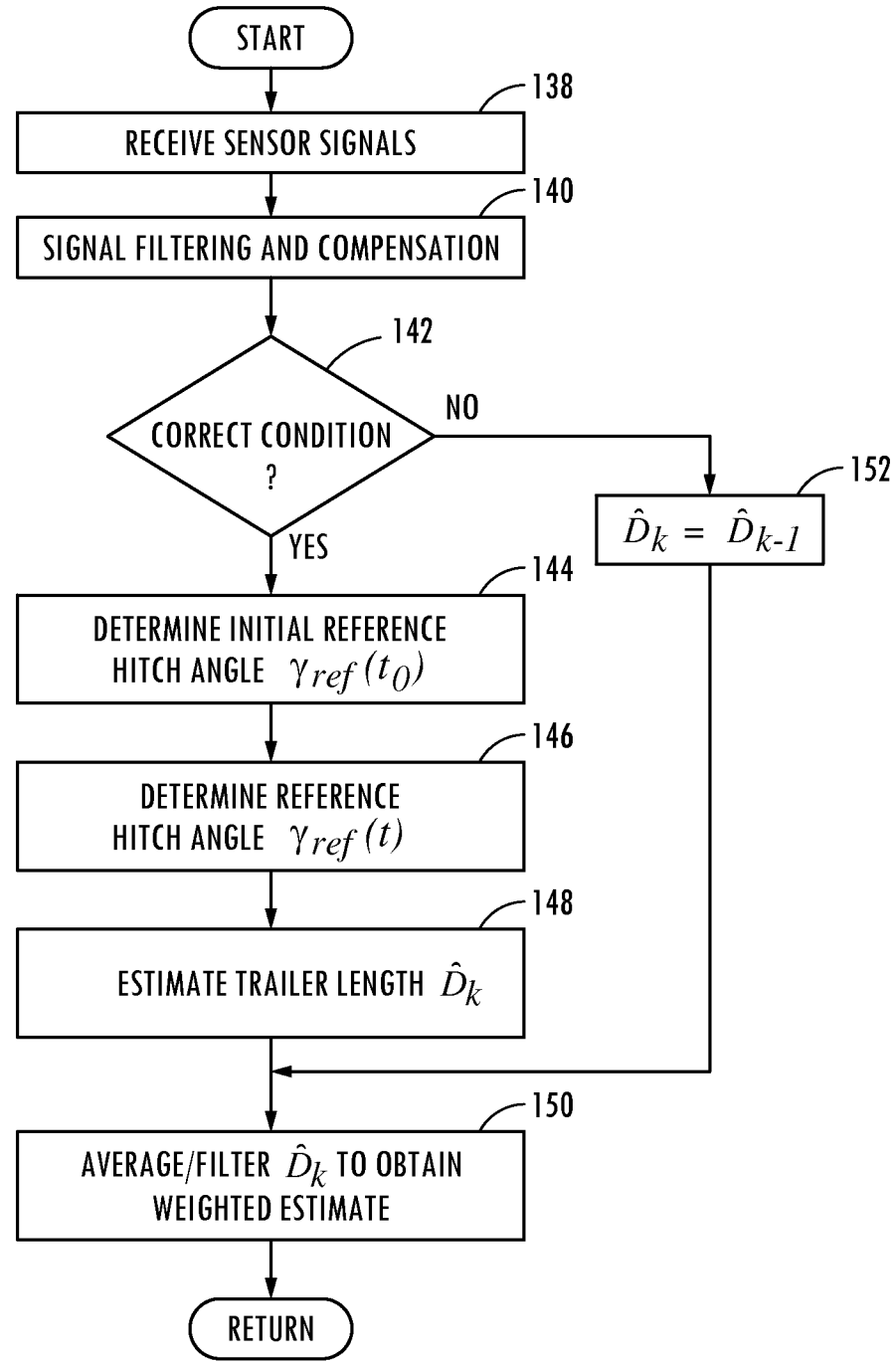
FIG. 4 is a flow diagram illustrating a method for estimating a length of a trailer coupled with a vehicle, according to an embodiment.

Turning now to FIG. 4, in another embodiment, controller 28 can implement a trailer length estimation routine 131 as-needed to determine the trailer length D within a desired degree of accuracy. In various examples described herein, this can be done separately from hitch angle estimation routing 130 or concurrently therewith, at least until an estimate with a desired accuracy has been achieved. In particular, trailer length estimation routine 131 may utilize an estimate of hitch angle $\gamma$ based on connection with the kinematic model of FIG. 3 to derive an estimate for trailer length D. A number of trailer length estimates, taken at regular time intervals over one or more identified periods in which conditions allow for such estimates, can be averaged or filtered to produce a final weighted estimate of trailer length D.

More specifically, according to the embodiment shown in FIG. 4, trailer length estimation routine 131 begins in step 138 by receiving signals from vehicle yaw rate sensor 60, vehicle speed sensor 58, trailer wheel speed sensor 23, trailer yaw rate sensor 25 and/or trailer accelerometer 27, along with other sensor signals that may be used in some embodiments, such as the steering angle $\delta$ signal, trailer lateral acceleration $a_{y2}$. At step 140, these signals may be filtered and any potential offsets may be compensated before proceeding to further process the sensor signals. In step 142, controller 28 determines whether conditions exist in which a trailer length estimate may be obtained. In particular, according to one aspect, when the trailer yaw rate signal $\omega_2$ is detected as being zero, a correct condition can be identified in step 140 and routine 131 can proceed to step 144, in which an initial reference hitch angle $\gamma_{ref}(t_0)$ is determined using the equation:

$$\gamma_{ref}(t_0) = \tan^{-1}\frac{\omega_1 L}{v_1}.$$

It is noted that, according to the kinematic relationship illustrated in FIG. 3, the hitch angle $\gamma$ may, in general, may be calculated by either of the equations:

$$\gamma = \sin^{-1}\frac{v_1\omega_2 D + \omega_1 L\sqrt{v_1^2 + \omega_1^2 L^2 - \omega_2^2 D^2}}{v_1^2 + \omega_1^2 L^2} \text{ or}$$

$$\gamma = \sin^{-1}\frac{\omega_2 D}{\sqrt{v_1^2 + \omega_1^2 L^2}} + \tan^{-1}\frac{\omega_1 L}{v_1}.$$

However, these general equations require the trailer length D to be known. As can be appreciated in light of these equations, by obtaining a condition where the trailer yaw rate $\omega_2$ is zero, the equation no longer depends on trailer length D and may, accordingly, be used in trailer length estimation routine for obtaining the initial reference hitch angle $\gamma_{ref}(t_0)$ when the condition is initially met.

In using the above equation for determining initial reference hitch angle $\gamma_{ref}(t_0)$, vehicle speed $v_1$ may be derived from vehicle wheel speed sensor 58. Vehicle yaw rate $\omega_1$ may be derived from yaw rate sensor 60, mounted on vehicle 14 or, alternatively, from a calculation utilizing separate left and right wheel speed sensors. As a further alternative, vehicle yaw rate $\omega_1$ can be derived from steering angle $\delta$ and vehicle speed $v_1$, using the equation:

$$\omega_1 = -\frac{v_1}{W}\tan\delta.$$

Similarly, trailer yaw rate $\omega_2$ may be derived from trailer yaw rate sensor 25, which may be mounted on trailer 12 or from left and right trailer wheel speed sensors. As a further alternative trailer yaw rate $\omega_2$ may be determined using trailer accelerometer 27 to obtain a value for trailer lateral acceleration $a_{y2}$, which can be used in with trailer speed $v_2$ (obtained from trailer wheel speed sensor 23) in calculating trailer yaw rate ω2 according to the equation:

$$\omega_2 = \frac{a_{y2}}{v_2}.$$

As an alternative for the condition in 142, initial reference hitch angle $\gamma_{ref}(t_0)$ can be determined if vehicle 14 is driving straight, in which case, initial reference hitch angle $\gamma_{ref}(t_0)$ can be set as equal to zero. Such a condition can be identified using steering angle $\delta$(obtained from steering angle sensor 67) vehicle lateral acceleration ay1, vehicle wheel speed sensor signals, or the like.

Continuing with reference to FIG. 4, after deriving initial reference hitch angle $\gamma_{ref}(t_0)$, trailer length estimation routine 131 advances to step 148, in which a reference hitch angle $\gamma_{ref}(t)$ is calculated over time (e.g. on a continuing basis) by taking the initial reference hitch angle $\gamma_{ref}(t_0)$ as a starting point and addition to it an integration of the difference between the trailer yaw rate $\omega_2$ and the vehicle yaw rate $\omega_1$, as represented by the equation:

$$\gamma_{ref}=\gamma_{ref}(t_0)+\int_{t_0}^{t}(\omega_2-\omega_1)d\tau.$$

As shown in the above equation, this integration is done over time, starting at the time, $t_0$, at which the initial reference hitch angle $\gamma_{ref}(t_0)$ was taken. By continuing to calculate the reference hitch angle $\gamma_{ref}$ over such a time, an instantaneous reference hitch angle $\gamma_{ref}$ can be obtained for a given time t, where $t \neq 0$ and in which, which can be used in step 148 to obtain a time-dependent trailer length estimate $\hat{D}$. In particular, the reference hitch angle $\gamma_{ref}$ can be calculated over a predetermined interval, such as about three seconds to about five seconds, for example, during which time, the kinematic state of the combined vehicle 14 and trailer 12 can diverge from the initial condition such that either $\omega_2$ or $\delta$, depending on the specified condition in step 142, is nonzero, with the reference angle $\gamma_{ref}$ obtained in a manner that remains independent of trailer length D.

By using the reference angle $\gamma_{ref}$ obtained in step 146, trailer length estimate $\hat{D}$ can be calculated in step 148 by either the of the equations:

$$\hat{D} = \frac{v_1}{\omega_2} \cdot \sin\gamma_{ref} - \frac{\omega_1 L}{\omega_2} \cdot \cos\gamma_{ref} \text{ or}$$

$$\hat{D} = \frac{\sqrt{v_1^2 + \omega_1^2 L^2}}{\omega_2} \cdot \sin\left(\gamma_{ref} - \tan^{-1}\frac{\omega_1 L}{v_1}\right).$$

The results of step 148 can be filtered in step 150 to provide a more accurate estimate. Additionally or alternatively, a number of different estimates for trailer length $\hat{D}_k$ can be taken at various intervals or under various conditions such that the various trailer length estimates $\hat{D}_k$ can be taken and averaged together to arrive at a final weighted estimate for trailer length D. As further shown in FIG. 4, if the system 10 is unable to detect an appropriate condition in step 142, above, the system can proceed in step 152 with the last known good estimate for trailer length D, such that, for a particular numbered interval $\hat{D}_k=\hat{D}_{k-1}$.

Figure 5:
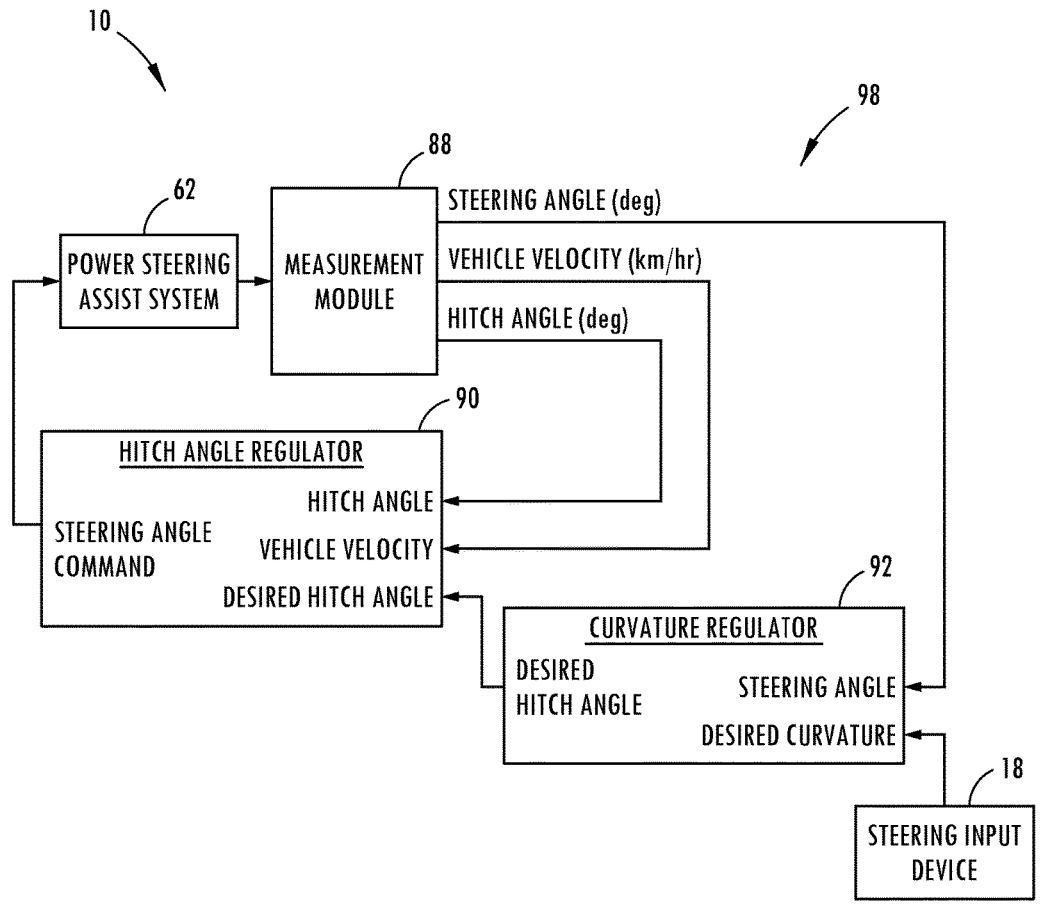
FIG. 5 is a schematic block diagram illustrating portions of a curvature controller, according to an additional embodiment, and other components of the trailer backup assist system, according to such an embodiment.

An embodiment of the curvature routine 98 of the trailer backup assist system 10 is illustrated in FIG. 5, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle $\gamma(d)$ based on the current desired curvature $\kappa_2$ along with the steering angle $\delta$ provided by a measurement module 88 in this embodiment of the controller 28. The measurement module 88 may be a memory device separate from or integrated with the controller 28 that stores data from sensors of the trailer backup assist system 10, trailer sensor module 20, the vehicle speed sensor 58, the steering angle sensor, or alternatively the measurement module 88 may otherwise directly transmit data from the sensors without functioning as a memory device. Once the desired hitch angle $\gamma(d)$ is computed by the curvature regulator 92 the hitch angle regulator 90 generates a steering angle command based on the computed desired hitch angle $\gamma(d)$ as well as a measured or otherwise estimated hitch angle $\gamma(m)$ and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 6:
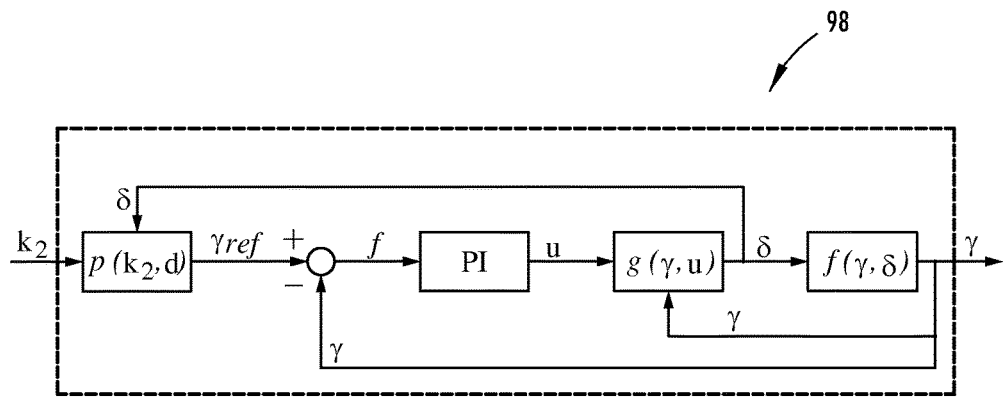
FIG. 6 is a schematic block diagram of the curvature controller of FIG. 5, showing the feedback architecture and signal flow of the curvature controller, according to such an embodiment.

As also shown in FIG. 6, the embodiment of the curvature routine 98 shown in FIG. 5 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, $p(\kappa_2, \delta)$, which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

$\delta$ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

With further reference to FIG. 6, the output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1+\frac{L}{D}\cos(\gamma)\right)}\left(u - \frac{v}{D}\sin(\gamma)\right)\right)$$

As also shown in FIG. 6, the feedback control law, $g(u, \gamma, v)$, is implemented with a proportional integral (PI) controller, whereby the integral portion substantially eliminates steady-state tracking error. More specifically, the control system illustrated in FIG. 68 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\bar{\delta}$$

$$\tan(\delta) = \bar{\delta} = \frac{W}{v(t)\left(1+\frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle γ(d) to reach or exceed a jackknife angle γ(j), as computed by the controller or otherwise determined by the trailer backup assist system 10, as disclosed in greater detail herein.

Figure 7:
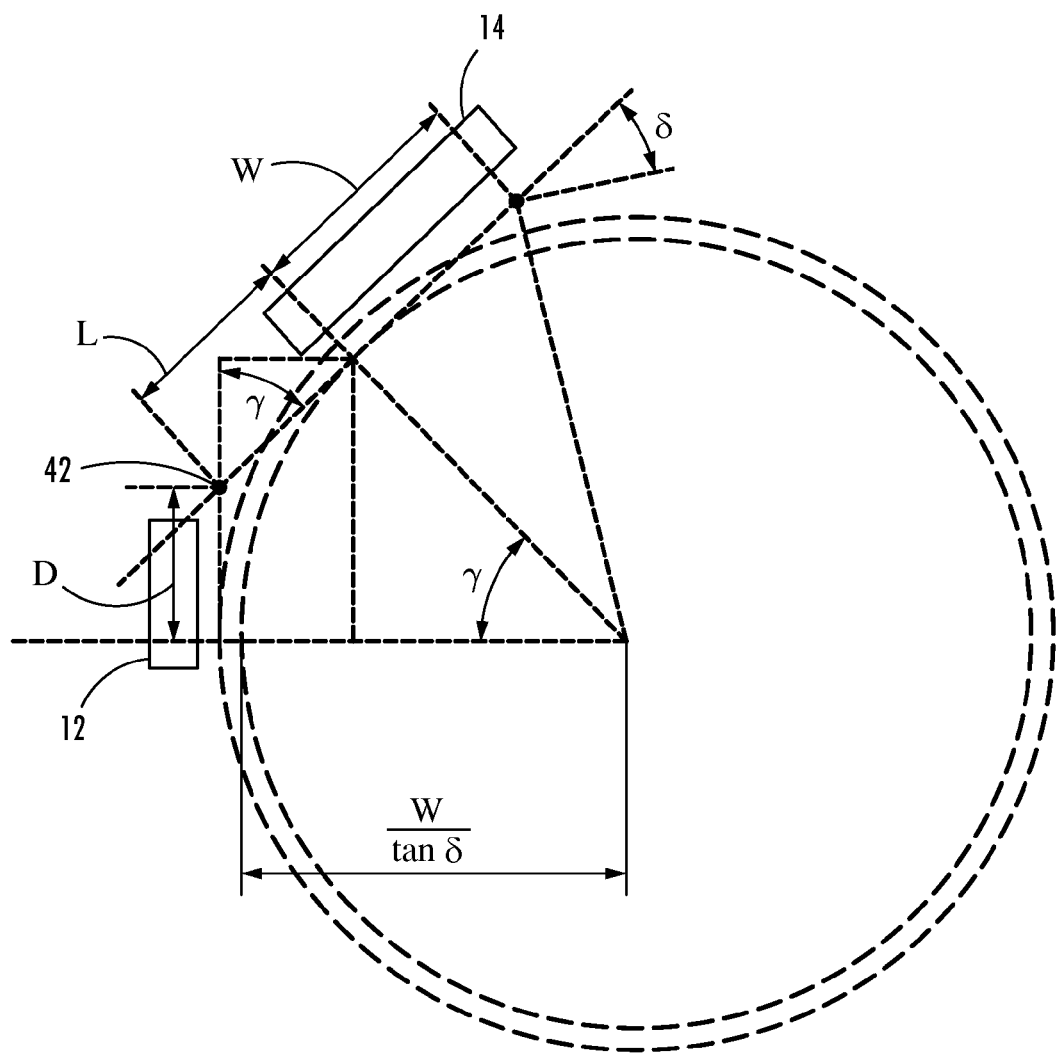
FIG. 7 is a schematic diagram showing a relationship between a hitch angle and a steering angle of the vehicle as it relates to curvature of the trailer and a jackknife angle.

Referring now to FIG. 7, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle γ(j) refers to a hitch angle γ that while backing cannot be overcome by the maximum steering input for a vehicle such as, for example, the steered front wheels of the vehicle 14 being moved to a maximum steered angle δ at a maximum rate of steering angle change. The jackknife angle γ(j) is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle γ for the vehicle 14 and the trailer 12 achieves or exceeds the jackknife angle γ(j), the vehicle 14 may be pulled forward to reduce the hitch angle γ. Thus, for limiting the potential for a vehicle/trailer system attaining a jackknife angle, it is preferable to control the yaw angle of the trailer 12 while keeping the hitch angle γ of the vehicle/trailer system relatively small.

A kinematic model representation of the vehicle 14 and the trailer 12 can also be used to determine a jackknife angle for the vehicle-trailer combination. Accordingly, with reference to FIGS. 4 and 7, a steering angle limit for the steered front wheels requires that the hitch angle γ cannot exceed the jackknife angle γ(j), which is also referred to as a critical hitch angle γ. Thus, under the limitation that the hitch angle γ cannot exceed the jackknife angle γ(j), the jackknife angle γ(j) is the hitch angle γ that maintains a circular motion for the vehicle/trailer system when the steered wheels 64 are at a maximum steering angle $\delta_{(max)}$. The steering angle for circular motion with hitch angle γ is defined by the following equation.

$$\tan\delta_{max} = \frac{w\sin\gamma_{max}}{D + L\cos\gamma_{max}}$$

Solving the above equation for hitch angle γ allows jackknife angle γ(j) to be determined. This solution, which is shown in the following equation, can be used in implementing trailer backup assist functionality in accordance with the disclosed subject matter for monitoring hitch angle γ in relation to jackknife angle.

$$\cos\bar{\gamma} = \frac{-b \pm \sqrt{b^2 - 4ac}}{2a}$$

where,
$a = L^2 \tan^2 \delta(max) + W^2$;
$b = 2 LD \tan^2 \delta(max)$; and
$c = D^2 \tan^2 \delta(max) - W^2$.

In certain instances of backing the trailer 12, a jackknife enabling condition can arise based on current operating parameters of the vehicle 14 in combination with a corresponding hitch angle γ. This condition can be indicated when one or more specified vehicle operating thresholds are met while a particular hitch angle γ is present. For example, although the particular hitch angle γ is not currently at the jackknife angle for the vehicle 14 and attached trailer 12, certain vehicle operating parameters can lead to a rapid (e.g., uncontrolled) transition of the hitch angle γ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle γ, information characterizing a vehicle accelerator pedal transient state, information characterizing a speed of the vehicle 14, information characterizing longitudinal acceleration of the vehicle 14, information characterizing a brake torque being applied by a brake system of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 8:
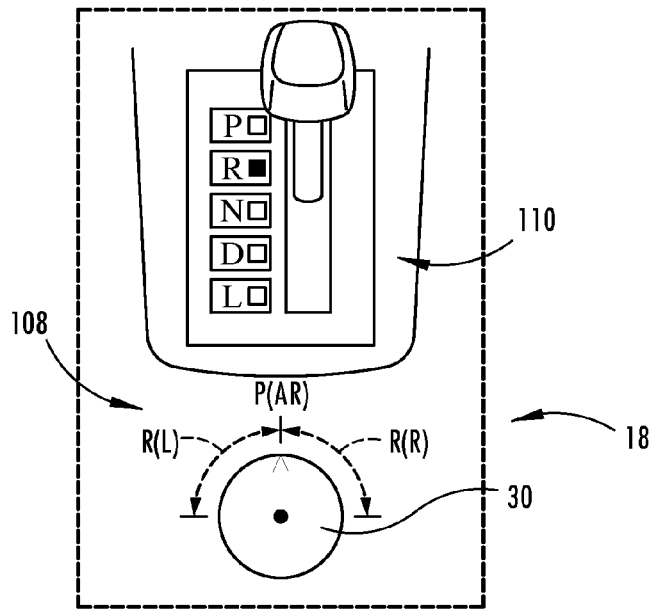
FIG. 8 is a plan view of a steering input device having a rotatable knob for operating the trailer backup assist system, according to one embodiment.

Referring now to FIG. 8, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 9:
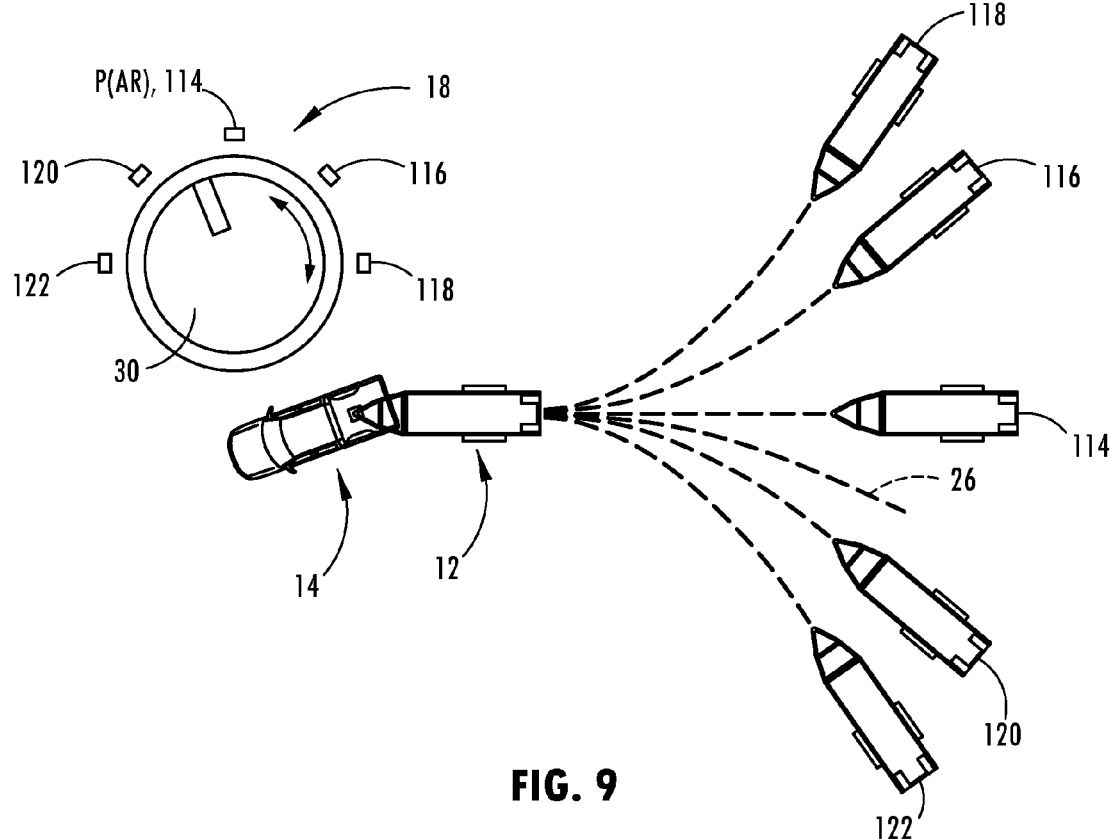
FIG. 9 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 8 and 9, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as a function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the controller 28. The at-rest position P(AR) of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 9, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 10:
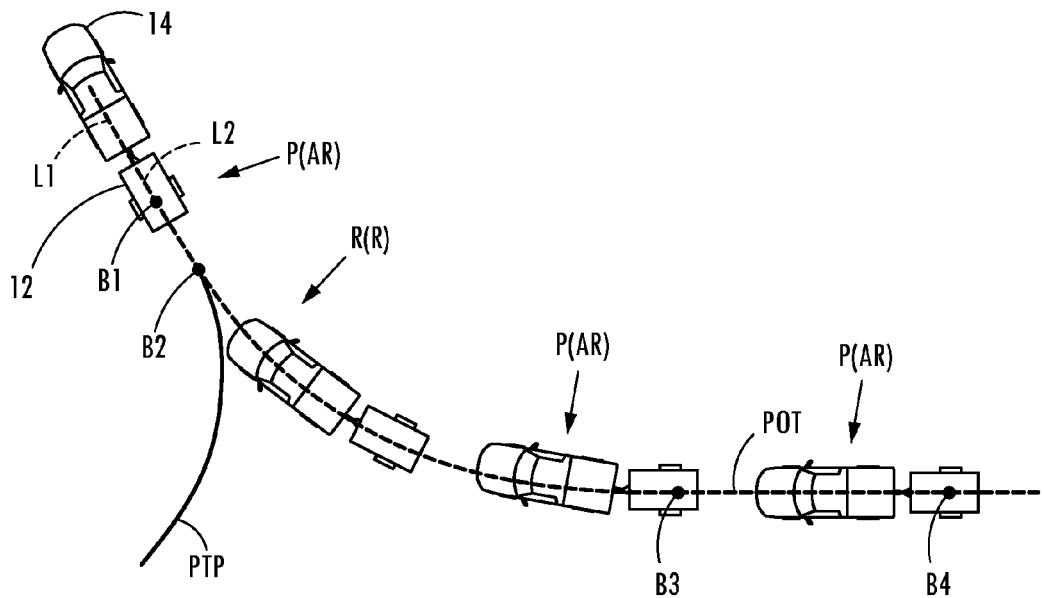
FIG. 10 is a schematic diagram showing a backup sequence of a vehicle and a trailer implementing various curvature selections with the trailer backup assist system, according to one embodiment.

Referring to FIG. 10, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-thru path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob is in/returned to the at-rest position P(AR).

In the embodiment illustrated in FIG. 10, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 11:
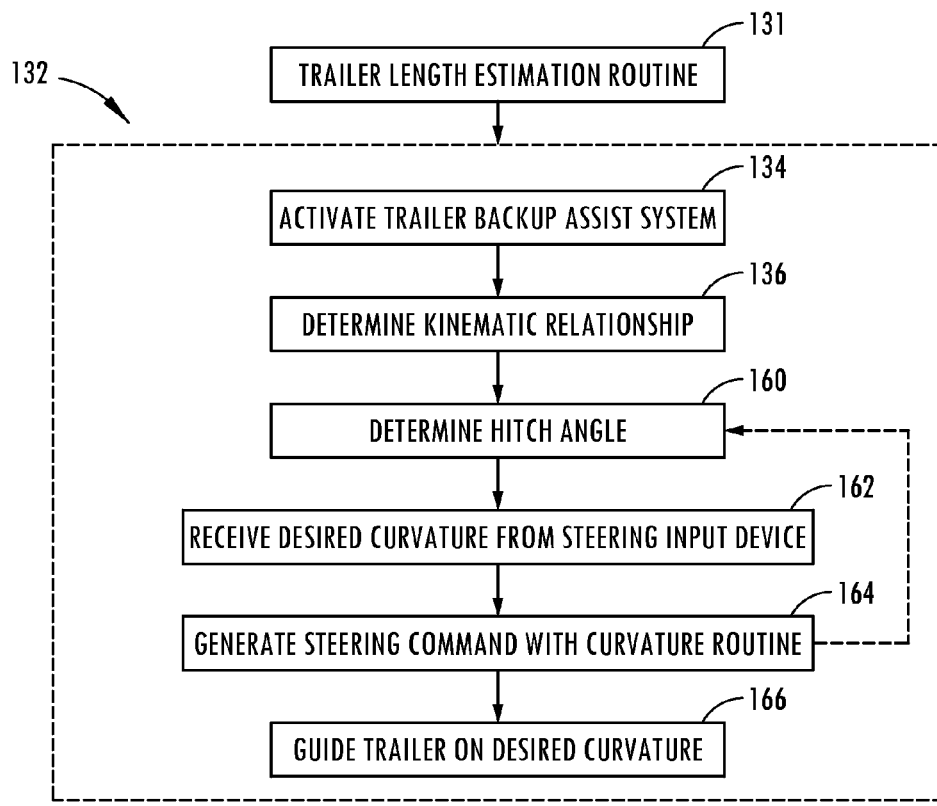
FIG. 11 is a flow diagram illustrating a method of operating a trailer backup assist system using an operating routine for steering a vehicle reversing a trailer with normalized control of the desired curvature, according to one embodiment.

With reference to FIG. 11, a method of operating one embodiment of the trailer backup assist system 10 is illustrated, shown as one embodiment of the operating routine 132 (FIG. 2). In one aspect, system 10 can be configured to lock out or deactivate operating routine 132 until a trailer length L estimate, or a trailer length L estimate of a particular measured reliability or quantity, has been obtained in step 131 (discussed further above with reference to FIG. 4). In an example where successive trailer length estimates $\hat{D}_k$ are averaged, the various trailer length estimates $\hat{D}_k$ can be analyzed to determine a statistical accuracy thereof, the operating routine 132 being activated once a threshold accuracy has been reached, at which point, operating routine 132 is allowed to be initiated, as requested by a user, in step 134 (FIG. 11), as discussed further below, using the weighted trailer length estimate as trailer length D in the kinematic model and the various equations used in operating routine 132 derived therefrom. System 10 can continue to refine the weighted average trailer length estimate during subsequent regular driving of vehicle 14 with trailer 12 attached therewith, even after such a threshold is reached, to further increase the accuracy thereof, such as to a cutoff accuracy threshold or the like.

At step 134, the method is initiated by the trailer backup assist system 10 being activated. It is contemplated that this may be done in a variety of ways, such a making a selection on the display 82 of the vehicle HMI 80. The next step 136, then determines the kinematic relationship between the attached trailer 12 and the vehicle 14. To determine the kinematic relationship, various parameters of the vehicle 14 and the trailer 12 must be sensed, input by the driver, or otherwise determined for the trailer backup assist system 10 to generate steering commands to the power assist steering system 62 in accordance with the desired curvature or backing path 26 of the trailer 12. As disclosed with reference to FIGS. 4-7, the kinematic parameters to define the kinematic relationship include a length of the trailer 12, a wheel base of the vehicle 14, a distance from a hitch connection to a rear axle of the vehicle 14, and a hitch angle γ between the vehicle 14 and the trailer 12, among other variables and parameters as previously described.

In one aspect, after the kinematic relationship is determined, the trailer backup assist system 10 may proceed at step 160 to determine the current hitch angle by processing the hitch angle estimation routine 130. As shown in FIG. 3, one embodiment of the kinematic relationship between the trailer 12 an the vehicle 14 is developed with the illustrated schematic diagram that shows the geometry of vehicle 14 and trailer 12 overlaid with a two-dimensional x-y coordinate system, identifying variables, such as the trailer yaw rate $\omega_2$ and the vehicle yaw rate $\omega_1$, which, in an embodiment, may be used to determine the corresponding hitch angle γ. As such, hitch angle estimation may be determined using trailer yaw rate signal $\omega_2$, vehicle speed signal $v_1$ and vehicle yaw rate signal $\omega_1$. More specifically, the yaw rate of the trailer is given by the following kinematic equation:

$$\omega_2 = \frac{v_1}{D}\sin\gamma - \frac{L}{D}\cos\gamma\omega_1$$

This kinematic equation can be rearranged to estimate trailer hitch angle γ, as follows:

$$\gamma = \sin^{-1}\frac{v_1\omega_2 D + \omega_1 L\sqrt{v_1^2 + \omega_1^2 L^2 - \omega_2^2 D^2}}{v_1^2 + \omega_1^2 L^2} \text{ or}$$

$$\gamma = \sin^{-1}\frac{\omega_2 D}{\sqrt{v_1^2 + \omega_1^2 L^2}} + \tan^{-1}\frac{\omega_1 L}{v_1}.$$

Figure 12:
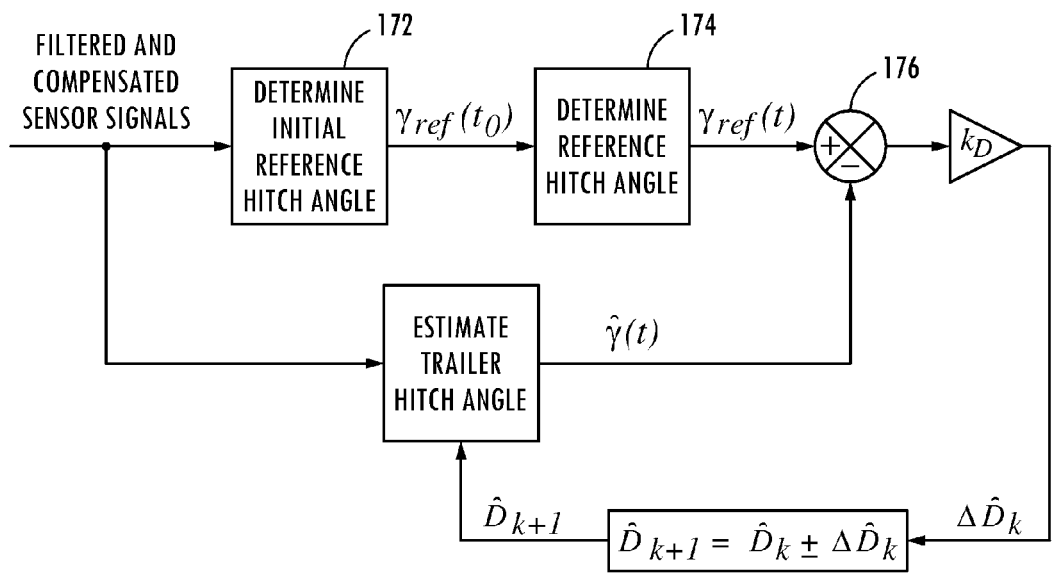
FIG. 12 is a schematic block diagram of a portion of a measurement module showing feedback architecture and signal flow thereof, according to an embodiment.

Turning now to FIG. 12, an embodiment including a variation of the trailer length estimation routine 131, discussed above, is illustrated in which hitch angle γ and trailer length D can be estimated simultaneously, such as during step 160 of operating routine 132. In particular, such estimates can be conducted using reference trailer hitch angle $\gamma_{ref}$, trailer yaw rate $\omega_2$ (as obtained or determined according to the various modes described above with respect to FIG. 4), vehicle speed $v_1$, and vehicle yaw rate $\omega_1$. As shown in FIG. 12, this routine 170 is implemented in a loop with a particular hitch angle γ and trailer length D being determined for a $k^{th}$ sampling period. As can be appreciated, the equation used to estimate hitch angle γ requires a value for D. Accordingly, system 10 may start with an initial value for $D_0$ stored in memory 86 that is known to at least be potentially inaccurate. In one aspect, the value for D may correspond to a generally accepted rough average trailer length for trailers towable with vehicle 14. In another aspect, system 10 may leave stored in memory 86 a previously-calculated value for trailer length D, even if the particular trailer 12 attached to vehicle 14 has been changed since the trailer length D estimate was obtained. In such embodiments, system 10 may not lock out operating routine 132 prior to an estimate obtained in step 131, as such a step may be omitted in this embodiment. In an alternative embodiment, system 10 may first obtain at least an initial estimate for trailer length D according to trailer length estimation routine 131, as discussed above, such an estimate being refined or corrected, if needed, by the routine 170 of FIG. 12.

Specifically, the hitch angle $\hat{\gamma}$ estimate can be determined in block 172 according to either of the modified equations:

$$\hat{\gamma}(k) = \sin^{-1}\frac{v_1\omega_2 \hat{D}_k + \omega_1 L\sqrt{v_1^2 + \omega_1^2 L^2 - \omega_2^2 \hat{D}_k^2}}{v_1^2 + \omega_1^2 L^2} \text{ or}$$

$$\hat{\gamma}(k) = \sin^{-1}\frac{\omega_2 \hat{D}_k}{\sqrt{v_1^2 + \omega_1^2 L^2}} + \tan^{-1}\frac{\omega_1 L}{v_1}.$$

The trailer hitch angle $\hat{\gamma}$ obtained using the above equations may include inaccuracies, because the initial trailer length estimate $D_0$ or the trailer length estimate $\hat{D}_k$ at a given sampling period k may not yet have converged to a reliably accurate value. Accordingly, simultaneously, with the hitch angle estimate $\hat{\gamma}$, an initial reference hitch angle $\gamma_{ref}(t_0)$ is calculated according to the trailer length D independent equation described above with respect to step 144 in FIG. 4. The initial reference hitch angle $\gamma_{ref}(t_0)$ is then used to determine a reference hitch angle $\gamma_{ref}$ that is also independent of trailer length D, using the integration described above in step 146 of FIG. 4. However, rather than using reference hitch angle $\gamma_{ref}$ to estimate trailer length D, the present routine 170 compares the hitch angle estimate $\hat{\gamma}$ with reference hitch angle $\gamma_{ref}$ in block 176 to derive an error rate. This error rate is then used in blocks 178 and 180 to adjust the trailer length estimate $\Delta\hat{D}$. In particular, if the amplitude of the hitch angle estimate $\hat{\gamma}$ is too large, compared to the reference hitch angle $\gamma_{ref}$, it indicates that the trailer length estimate $\hat{D}$ is too large and needs to be reduced for a subsequent sampling period in which k=k+1, the converse also being appropriately inferred. This adjustment is made by feeding the error rate derived in block 176 into an adaptation gain block 178, in which a constant or time-dependent application gain $k_D$ of greater than zero is applied to the error signal to determine a proportionate trailer length estimate change $\Delta\hat{D}$ in that is then added to the trailer length estimate $\hat{D}$ in block 180, resulting in a revised trailer length estimate for the subsequent sampling period $\hat{D}_{k+1}$ according to the following logic:

if ($\gamma_{ref}(k)$>0 and $\hat{\gamma}(k)$>0)
{
$\hat{D}_{k+1} = \hat{D}_k + (\gamma_{ref}(k) - \hat{\gamma}(k)) \cdot k_D$
}
else if ($\gamma_{ref}(k)$<0 and $\hat{\gamma}(k)$<0)
{
$\hat{D}_{k+1} = \hat{D}_k - (\gamma_{ref}(k) - \hat{\gamma}(k))) \cdot k_D$
}.

The loop, according to the above, is then continued, with $\hat{D}$ converging over time to an accurate or true value for the trailer length D.

Returning to FIG. 11, regardless of the variation of step 160 (independent of a trailer length estimate or simultaneously therewith), operating routine 132 continues at step 162 in which the position and rate of change is received from the steering input device 18, such as the angular position and rate of rotation of the rotatable knob 30, for determining the desired curvature 26. At step 164, steering commands may be generated based on the desired curvature, correlating with the position and rate of change of the steering input device 18. The steering commands and actuation commands generated may be generated in conjunction with processing of the curvature routine 98, as previous discussed. At step 166, the steering commands and actuation commands have been executed to guide the trailer 12 on the desired curvature provided by the steering input device 18.

In parallel with performing the operations for receiving the trailer backup assist requests, determining the desired curvature 26 of the trailer 12, and generating the vehicle steering commands, the trailer backup assist system 10 may perform an operation for monitoring if an unacceptable trailer backup condition exists. Examples of such monitoring include, but are not limited to assessing a hitch angle $\gamma$ to determine if a hitch angle $\gamma$ threshold is exceeded, assessing a backup speed to determine if a backup speed threshold is exceeded, assessing vehicle steering angle to determine if a vehicle steering angle threshold is exceeded, assessing other operating parameters (e.g., vehicle longitudinal acceleration, throttle pedal demand rate and hitch angle rate) for determining if a respective threshold value is exceeded, and the like. Backup speed can be determined from the wheel speed information obtained from one or more speed sensors 58 of the vehicle 14. If it is determined that an unacceptable trailer backup condition exists, an operation may be performed for causing the current path of travel of the trailer 12 to be inhibited (e.g., stopping motion of the vehicle 14), followed by the operation being performed for ending the current trailer backup assist instance. It is disclosed herein that prior to and/or in conjunction with causing the current trailer path to be inhibited, one or more actions (e.g., operations) can be implemented for providing the driver with feedback (e.g., a warning) that such an unacceptable hitch angle condition is impending or approaching. In one example, if such feedback results in the unacceptable hitch angle condition being remedied prior to achieving a critical condition, the method can continue with providing trailer backup assist functionality in accordance with operations. Otherwise, the method can proceed to operation for ending the current trailer backup assist instance. In conjunction with performing the operation for ending the current trailer backup assist instance, an operation can be performed for controlling movement of the vehicle 14 to correct or limit a jackknife condition (e.g., steering the vehicle 14, decelerating the vehicle 14, limiting magnitude and/or rate of driver requested trailer curvature input, limiting magnitude and/or rate of the steering command, and/or the like to preclude the hitch angle from being exceeded).

With the sensor system 16 and/or controller 28 providing the trailer yaw rate $\omega_2$, this parameter may additionally or alternatively be utilized to improve the electronic stability control provided with the power assist steering system 62 when the vehicle 14 is towing a trailer. Some electronic stability control systems use a so called bicycle model (without trailer) to obtain a reference vehicle yaw rate commanded by the driver. However, when the vehicle is towing a trailer, the towing vehicle may exhibit more oversteer or more understeer tendencies during a turn, compared to the same vehicle without a trailer attached. Thus the electronic stability control performance may degrade, and/or unintended activations may occur, when the vehicle is towing a trailer.

By using the sensed or otherwise determined trailer yaw rate signal $\omega_2$, together with other electronic stability control signals, the additional oversteer or understeer tendencies of the vehicle (compared to when not towing a trailer) can be identified. Accordingly, the existing electronic stability control system can be sensitized or desensitized (e.g., by modifying the control thresholds for the brake and engine controllers). The brake and engine control actions can also be increased or reduced by changing the controller gains. Therefore, an additional controller which uses trailer yaw rate signal $\omega_2$ (or the difference between trailer and vehicle yaw rate, i.e., $\omega_2-\omega_1$) and its derivative may be integrated with the existing electronic stability control system. Such a controller is beneficial for improving the overall vehicle-trailer combination stability In addition, it is contemplated that using the trailer yaw rate signal $\omega_2$ and trailer lateral acceleration signal $a_{y2}$, together with other standard electronic stability control signals, may further identify additional oversteer or understeer tendencies of the vehicle. It is also conceivable that a controller that uses the trailer hitch angle $\gamma$ as a feedback signal may be integrated with the existing electronic stability control system for improving the overall vehicle-trailer combination stability.

As previously mentioned, the hitch angle γ determined by the hitch angle estimation routine 130 may also be used to identify and stabilize a swaying trailer. More specifically, the vehicle-trailer combination becomes less damped when its speed is increased. With any driver inputs or external disturbances, the trailer may start to oscillate and the oscillation may sustain for a long time. If the speed is above certain "critical speed", the system may become unstable, causing the oscillation amplitude to grow larger and eventually cause vehicle instability and/or a jackknife condition. A controller which uses trailer yaw rate signal $\omega_2$ (or the difference between trailer and vehicle yaw rate, i.e., $\omega_2-\omega_1$) and its derivative can be designed to actively control the vehicle/trailer to damping out the oscillation. In addition, the trailer yaw rate $\omega_2$ and the trailer lateral acceleration $a_{y2}$, together with other standard electronic stability control signals, may be used to stabilize a swaying trailer. Since both trailer yaw rate signal $\omega_2$ and trailer lateral acceleration signal $a_{y2}$ directly provide information about the trailer motion, they can be used to quickly identify whether the trailer is swaying.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A backup assist system for a vehicle reversing a trailer, comprising:
   a trailer sensor outputting a trailer yaw rate;
   a vehicle sensor system outputting a vehicle yaw rate and a vehicle speed; and
   a controller:
      estimating a hitch angle between the vehicle and the trailer using an integration of a difference between the trailer yaw rate and the vehicle yaw rate over time;
      estimating a length of the trailer using the estimated hitch angle, the vehicle yaw rate, the vehicle speed, and the trailer yaw rate in a kinematic relationship; and
      using the trailer length in the kinematic relationship to control the vehicle.

2. The system of claim 1, wherein the estimated hitch angle is a reference estimated hitch angle.

3. The system of claim 2, wherein the reference estimated hitch angle is further determined by adding an initial reference hitch angle to the integration of the difference between the trailer yaw rate and the vehicle yaw rate over the predetermined period of time, the initial reference hitch angle corresponding to a start point of the predetermined period of time.

4. The system of claim 3, wherein the initial reference estimated hitch angle is determined using an equation derived from the kinematic model that is independent of a trailer length measurement.

5. The system of claim 2, wherein the system performs the integration of the difference between the trailer yaw rate and the vehicle yaw rate over the predetermined period of time before estimating the length of the trailer.

6. The system of claim 2, wherein the controller:
   sequentially derives a plurality of estimated trailer lengths based on corresponding ones of a plurality of reference estimated hitch angles; and
   derives a final weighted trailer length estimate by one of averaging and filtering the plurality of instantaneous estimated trailer lengths.

7. The system of claim 1, wherein the system determines the estimated length of the trailer using the reference estimated hitch angle in view of the kinematic relationship.

8. The system of claim 7, wherein the controller simultaneously and instantaneously determines the estimated hitch angle and the estimated length of the trailer.

9. The system of claim 8, wherein the controller instantaneously determines the estimated hitch angle using the estimated length of the trailer.

10. The system of claim 8, wherein the controller:
compares the estimated hitch angle with the reference estimated hitch angle to determine an error signal; and
adjusts the trailer length estimate using the error signal.

11. The system of claim 1, further including a curvature input device outputting a first curvature signal, wherein:
the controller further implements a trailer backup mode including reversing the trailer based on the first curvature signal, the estimated length of the trailer, and the estimated hitch angle in view of the kinematic relationship.

12. A backup assist system for a vehicle reversing a trailer, comprising:
a first sensor coupled with the trailer for determining a trailer yaw rate;
a second sensor coupled with the vehicle for determining a vehicle yaw rate; and
a controller:
estimating a hitch angle between the vehicle and the trailer using an integration of a difference between the trailer yaw rate and the vehicle yaw rate over time;
determining an estimated length of the trailer using the estimated hitch angle, the vehicle yaw rate, the vehicle speed, and the trailer yaw rate as inputs to a kinematic relationship between the trailer and the vehicle; and
controlling a steering system of the vehicle using the estimated length of the trailer as a further input to the kinematic relationship.

13. The system of claim 12, wherein the estimated hitch angle is a reference estimated hitch angle.

14. The system of claim 13, wherein the controller:
sequentially derives a plurality of estimated trailer lengths based on corresponding ones of a plurality of reference estimated hitch angles; and
derives a final weighted trailer length estimate by one of averaging and filtering the plurality of instantaneous estimated trailer lengths.

15. The system of claim 12, wherein the controller simultaneously and instantaneously determines the estimated hitch angle and the estimated length of the trailer.

16. The system of claim 15, wherein the controller:
compares the estimated hitch angle with a reference estimated hitch angle to determine an error signal; and
adjusts the trailer length estimate using the error signal.

17. A method for reversing a trailer towed by a vehicle, comprising:
receiving a trailer yaw rate signal;
receiving a vehicle yaw rate signal;
receiving a vehicle speed signal;
estimating a hitch angle between the vehicle and the trailer using an integration of a difference between the trailer yaw rate signal and the vehicle yaw rate signal over time;
determining an estimated length of the trailer using the estimated hitch angle, the vehicle yaw rate signal, the vehicle speed signal, and the trailer yaw rate signal as inputs to a kinematic relationship between the trailer and the vehicle; and
controlling a vehicle steering system using the estimated length of the trailer as a further input to the kinematic relationship.

18. The method of claim 17, wherein the estimated hitch angle is a reference estimated hitch angle.

19. The method of claim 18, further comprising:
sequentially determining a plurality of estimated trailer lengths based on corresponding ones of a plurality of reference estimated hitch angles; and
deriving a final weighted trailer length estimate by one of averaging and filtering the plurality of instantaneous estimated trailer lengths.

20. The method of claim 19, wherein the estimated hitch angle and the estimated length of the trailer are simultaneously and instantaneously determined, the method further comprising:
comparing the estimated hitch angle with a reference estimated hitch angle to determine an error signal; and
adjusting the trailer length estimate using the error signal.

* * * * *